United States Patent
Einsla et al.

(10) Patent No.: US 11,760,822 B2
(45) Date of Patent: Sep. 19, 2023

(54) METHODS OF MAKING PRESSURE SENSITIVE ADHESIVE COMPOSITIONS

(71) Applicant: Rohm and Haas Company, Collegeville, PA (US)

(72) Inventors: Melinda L. Einsla, Royersford, PA (US); Steven R. Patrick, Douglassville, PA (US); William B. Griffith, Jr., North Wales, PA (US); Paul Nedwick, Lansdale, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/563,385

(22) PCT Filed: Mar. 2, 2016

(86) PCT No.: PCT/US2016/020430
§ 371 (c)(1),
(2) Date: Sep. 29, 2017

(87) PCT Pub. No.: WO2016/160250
PCT Pub. Date: Oct. 6, 2016

(65) Prior Publication Data
US 2018/0086867 A1   Mar. 29, 2018

Related U.S. Application Data

(60) Provisional application No. 62/141,100, filed on Mar. 31, 2015.

(51) Int. Cl.
| | |
|---|---|
| C08F 220/18 | (2006.01) |
| C09J 7/38 | (2018.01) |
| C08F 265/06 | (2006.01) |
| C09J 133/08 | (2006.01) |
| C09J 151/00 | (2006.01) |

(52) U.S. Cl.
CPC ...... *C08F 220/1804* (2020.02); *C08F 265/06* (2013.01); *C09J 7/385* (2018.01); *C09J 133/08* (2013.01); *C09J 151/00* (2013.01); *C08F 2800/20* (2013.01); *C09J 2301/414* (2020.08); *C09J 2433/00* (2013.01)

(58) Field of Classification Search
CPC .............. C08F 220/18; C08F 265/06; C08F 2220/1825; C08F 2800/20; C08F 220/08; C08F 220/1804; C09J 7/385; C09J 133/08; C09J 151/00; C09J 2205/114; C09J 2433/00; C09J 2301/414; C90J 151/00

USPC ................................................ 526/282, 280
See application file for complete search history.

(56) References Cited

U.S. PATENT DOCUMENTS

| | | |
|---|---|---|
| 5,236,991 A | 8/1993 | Makati et al. |
| 6,303,726 B1 | 10/2001 | Schuler et al. |
| 6,657,011 B2 | 12/2003 | Lau et al. |
| 6,992,121 B1 | 1/2006 | Peters et al. |
| 7,332,540 B2 | 2/2008 | Theelen et al. |
| 7,598,303 B2 | 10/2009 | Lau |
| 7,723,466 B2 | 5/2010 | Theelen et al. |
| 2003/0125459 A1* | 7/2003 | Wulff .................. C08F 2/22 524/800 |
| 2009/0020225 A1 | 1/2009 | Wulff et al. |
| 2010/0003442 A1* | 1/2010 | Even .................. C08L 33/08 428/41.3 |

FOREIGN PATENT DOCUMENTS

| | | |
|---|---|---|
| EP | 0921138 A1 | 6/1999 |
| EP | 1273643 A1 | 1/2003 |
| EP | 1240223 B1 | 1/2004 |

OTHER PUBLICATIONS

PCT/US2016/020430, International Search Report and Written Opinion dated Jun. 15, 2016.
PCT/US2016/020430, International Preliminary Report on Patentability dated Oct. 12, 2017.

* cited by examiner

*Primary Examiner* — Ling Siu Choi
*Assistant Examiner* — Ronald Grinsted
(74) *Attorney, Agent, or Firm* — Boyle Fredrickson, S.C.

(57) ABSTRACT

Disclosed is a method comprising: a) dispersing a first monomer mixture comprising least one least monomer, the first monomer mixture having a total glass transition temperature (Tg) in the range of from $-10°$ C. to $-65°$ C. with a surfactant and an initiator in an aqueous medium; b) when the first monomer mixture is completely dispersed, adding a second monomer mixture comprising at least one monomer, the second monomer mixture having a Tg at least $20°$ C. greater than the Tg of the first monomer mixture, to the aqueous medium; c) when the second monomer mixture is completely dispersed, adding a third monomer mixture comprising at least one monomer, the third monomer mixture having a Tg in the range of from $-25°$ C. to $50°$ C.; and d) forming a polymer with the first, second, and third monomer mixtures. Also disclosed is a pressure sensitive adhesive comprising the polymer formed by this method.

1 Claim, No Drawings

METHODS OF MAKING PRESSURE SENSITIVE ADHESIVE COMPOSITIONS

REFERNECE TO RELATED APPLICATION

The present application claims the benefit of U.S. Provisional Application No. 62/141,100, filed on Mar. 31, 2015.

FIELD OF INVENTION

The instant disclosure relates to pressure sensitive adhesive compositions, and method of making the same.

BACKGROUND OF THE INVENTION

The use of pressure sensitive adhesives in different end-use applications is generally known. A pressure-sensitive adhesive must have sufficient adhesion and cohesion to a substrate. The adhesive must adhere instantaneously to the substrate upon the application of pressure. Cohesion comes into play during such steps as converting where low cohesion can be an indication of too much ooze.

Pressure sensitive adhesives are prepared by mixing polymers with additives such as tackifiers and fillers. Typically, adhesive and cohesive strength are at odds with each other. Improving both properties simultaneously is difficult.

Therefore, a preparation process resulting in pressure sensitive adhesives with increased cohesive strength and adhesion would be desirable.

SUMMARY OF THE INVENTION

A method is disclosed comprising: a) dispersing a first monomer mixture comprising at least one monomer, the first monomer mixture having a total glass transition temperature (Tg) in the range of from −10° C. to −65° C., with a surfactant and an initiator in an aqueous medium; b) when the first monomer mixture is completely dispersed in the aqueous medium, adding a second monomer mixture to the aqueous medium comprising at least one monomer, the second monomer mixture having a Tg at least 20° C. greater than the Tg of the first monomer mixture; c) when the second monomer mixture is completely dispersed, adding a third monomer mixture to the aqueous medium comprising at least one monomer, the third monomer mixture having a Tg in the range of from −25° C. to 50° C.; and d) forming a polymer with the first, second, and third monomer mixtures.

A pressure sensitive adhesive comprising the polymer formed according to the method is also disclosed.

The pressure sensitive adhesive composition may further include optionally one or more surfactants, one or more dispersants, one or more thickeners, one or more pigments, one or more fillers, one or more freeze-thaw agent, one or more neutralizing agents, one or more plasticizers, one or more tackifiers, one or more adhesion promoters, one or more crosslinkers, one or more defoamers, and combinations thereof.

DETAILED DESCRIPTION OF THE INVENTION

Emulsion polymerization is a well-known process, such as, for example as disclosed in U.S. Pat. Nos. 4,325,856, 4,654,397, and 4,814,373.

The first monomer mixture comprises at least one monomer. In some embodiments, the first monomer mixture comprises a mixture of more than one monomer. The resulting first monomer mixture will have a total glass transition temperature (Tg) in the range of from −10° C. to −65° C. Any and all temperatures between −10 and −65° C. are included herein and disclosed herein; for example, the first monomer mixture can have a total Tg in the range of from −15° C. to −45° C., −20° C. to −40° C., or −25° C. to −30° C.

As used herein, the term "glass transition temperature" or "Tg" refers to the glass transition temperature of a material as determined by Differential Scanning Calorimetry (DSC) scanning from −90° C. to 150° C. at a rate of 20° C./min on a DSCQ2000 manufactured by TA Instrument, New Castle, Del. The Tg is the inflection point of the curve of heat flow vs. temperature or the maximum value on the plot of its derivative.

Examples of monomers that can be used in the first monomer mixture include, but are not limited to, butyl acrylate, ethylhexyl acrylate, ethyl acrylate, methyl acrylate, octyl methacrylate, isooctyl methacrylate, decyl methacrylate, isodecyl methacrylate, lauryl methacrylate, pentadecyl methacrylate, stearyl methacrylate, octyl acrylate, isooctyl acrylate, decyl acrylate, isodecyl acrylate, lauryl acrylate, C12 to C18 alkyl methacrylates, cyclohexyl acrylate, cyclohexyl methacrylate and combinations thereof.

The second monomer mixture is added to the dispersion after the entire first monomer mixture is completely dispersed. 'Completely dispersed', as used herein, means that all of the first monomer mixture has been added to the aqueous medium. The first monomer mixture is not necessarily completely polymerized before the addition of the second monomer mixture. The second monomer mixture also comprises at least one monomer. In some embodiments, the second monomer mixture comprises a mixture of more than one monomer. The resulting second monomer mixture will have a total Tg at least 20° C. greater than the total Tg of the first monomer mixture.

Examples of monomers that can be used in the second monomer mixture include, but are not limited to styrene, methyl methacrylate, butyl methacrylate, isobutyl methacrylate, ethyl acrylate, dihydrodicyclopentadienyl acrylate, isobornyl (meth)acrylate, (alpha methyl) styrene, and combinations thereof.

The third monomer mixture is added to the dispersion after the entire second monomer mixture is dispersed. The third monomer mixture also comprises at least one monomer. In some embodiments, the third monomer mixture comprises a mixture of more than one monomer. The resulting third monomer mixture will have a total Tg of from −25° C. to 50° C. In an embodiment, the weight average molecular weight of the polymer produce from the third mixture will be less than 50,000. In an embodiment, the polymer will be substantially comprised of uncrosslinked material.

Examples of monomers that can be used in the third monomer mixture include, but are not limited any acrylic or methacrylic monomers such as butyl methacrylate, butyl acrylate, hydroxyl (meth)acrylates, isobornyl (meth)acrylate, vinyl acetate, acrylamide, acrylonitrile, styrene and combinations thereof.

The initiator for use in the process for the production of the polymer can be either a thermal initiator or a redox system. Thermal initiators include, but are not limited to ammonium persulfate. If the initiator is a redox system, the reducing agent can be an ascorbic acid, a sulfoxylate or an erythorbic acid, while the oxidating agent can be a peroxide or a persulfate.

A surfactant is a compound that reduces surface tension when dissolved in water or water solutions, or that reduces interfacial tension between two liquids, or between a liquid and a solid. Surfactants useful for preparing a stable dispersion in the practice of the present invention may be cationic surfactants, anionic surfactants, zwitterionic, or a non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants, such as ethoxylated alcohol, ethoxylated fatty acid, sorbitan derivative, lanolin derivative, ethoxylated nonyl phenol or alkoxylated polysiloxane.

Together, the first, second, and third monomer mixtures form a polymer. The polymer can have composite particles of either the same or different sizes.

In some embodiments of the disclosure, there is provided a pressure sensitive adhesive comprising the polymer formed by the above method. The pressure sensitive adhesive composition may further include, optionally, one or more thickeners, one or more pigments, one or more fillers, one or more freeze-thaw agents, one or more neutralizing agents, one or more plasticizers, one or more tackifiers, one or more adhesion promoters, one or more crosslinkers, one or more defoamers, and combinations thereof.

The pressure sensitive adhesive composition may further include, optionally, one or more thickeners. The pressure sensitive adhesive composition may comprise 0.1 to 5 percent by weight of one or more thickeners. All individual values and subranges from 0.1 to 5 weight percent are included herein and disclosed herein. For example, the weight percent of thickeners can be from a lower limit of 0.1, 0.2, 0.3, or 0.5 weight percent to an upper limit of 1, 2, 3, 4, or 5 weight percent. Such thickeners are commercially available under the tradename Acrysol™, Celosize™ from the Dow Chemical Company, Midland, Mich.

The pressure sensitive adhesive composition may further include, optionally, one or more pigments. The pressure sensitive adhesive composition may comprise 0 to 10 percent by weight of one or more pigments. All individual values and subranges from 0 to 10 weight percent are included herein and disclosed herein. For example, the weight percent of pigments can be from a lower limit of 0.1, 0.2, 0.3, 0.5, 1, 2, 3, 4, or 5 weight percent to an upper limit of 1, 2, 3, 4, 5, 6, 7, 8, 9, or 10 weight percent. Such pigments include, but are not limited to, titanium dioxide, which are commercially available under the tradename Ti-Pure™ from the DuPont, Wilmington, Del., USA.

The pressure sensitive adhesive composition may further include, optionally, one or more fillers. The pressure sensitive adhesive composition may comprise 0 to 80 percent by weight of one or more fillers. All individual values and subranges from 0 to 80 weight percent are included herein and disclosed herein. For example, the weight percent of fillers can be from a lower limit of 0.1, 0.2, 0.3, 0.5, 1, 2, 3, 4, 5, 10, 20, 30, or 40 weight percent to an upper limit of 15, 20, 25, 35, 45, 55, 65, 75, or 80 weight percent. Such fillers include, but are not limited to, calcium carbonate, commercially available under the tradename Drikalite™ from the Imeyrys, Victoria, Australia, barium sulfate, aluminum silicate, ceramic micro-spheres, glass micro-spheres, clays, and fly ash.

The pressure sensitive adhesive composition may further include, optionally, one or more freeze-thaw agents. The pressure sensitive adhesive composition may comprise 0.1 to 2 percent by weight of one or more freeze-thaw agents. All individual values and subranges from 0.1 to 2 weight percent are included herein and disclosed herein. For example, the weight percent of freeze-thaw agents can be from a lower limit of 0.1, 0.2, 0.3, or 0.5 weight percent to an upper limit of 05, 1, 1.5, or 2 weight percent. Freeze-thaw agents, as used herein, refer to additives that typically prevent coagulation of the dispersion when exposed to extreme temperature cycles. Such freeze-thaw agents include, but are not limited to, glycols such as ethylene glycol, diethylene glycol, propylene glycol, dipropylene glycol, butylene glycol, dibutylene glycol. Such glycols are commercially available from the Dow Chemical Company, Midland, Mich.

The pressure sensitive adhesive composition may further include, optionally, one or more neutralizing agents. The pressure sensitive adhesive composition may comprise 0.1 to 2 percent by weight of one or more neutralizing agents. All individual values and subranges from 0.1 to 2 weight percent are included herein and disclosed herein. For example, the weight percent of neutralizing agents can be from a lower limit of 0.1, 0.2, 0.3, or 0.5 weight percent to an upper limit of 05, 1, 1.5, or 2 weight percent. Neutralizing agents are typically used to control pH to provide stability to the formulated pressure sensitive adhesive composition. Such neutralizing agents include, but are not limited to, aqueous ammonia or aqueous amines, or other aqueous inorganic salts.

The pressure sensitive adhesive composition may further include, optionally, one or more plasticizers. The pressure sensitive adhesive composition may comprise less than 40 percent by weight of one or more plasticizers. All individual values and subranges from less than 40 weight percent are included herein and disclosed herein. Gor example, the weight percent of plasticizers can be from a lower limit of 0.1, 0.2, 0.3, 0.5, 1, 2, 3, 4, or 5 weight percent to an upper limit of 10, 20, 30, or 40 weight percent. Such plasticizers are commercially available under the tradename Jayflex™ from ExxonMobil Chemical Company, Texas, USA.

The pressure sensitive adhesive composition may further include, optionally, one or more tackifiers. The pressure sensitive adhesive composition may comprise less than 50 percent by weight of one or more tackifiers. All individual values and subranges from less than 50 weight percent are included herein and disclosed herein. For example, the weight percent of tackifiers can be from a lower limit of 0.1, 0.2, 0.3, 0.5, 1, 2, 3, 4, or 5 weight percent to an upper limit of 10, 20, 30, 40, or 50 weight percent. Some examples of tackifiers include, but are not limited to non-hydrogenated aliphatic $C_5$ resins, hydrogenated aliphatic $C_5$ resins, aromatic modified $C_5$ resins, terpene resins, hydrogenated $C_9$ resins, and combinations thereof. In an embodiment, the third monomer mixture provides a tackifier function.

The pressure sensitive adhesive composition may further include, optionally, one or more adhesion promoters. The pressure sensitive adhesive composition may comprise less than 5 percent by weight of one or more adhesion promoters. All individual values and subranges from less than 5 weight percent are included herein and disclosed herein. For example, the weight percent of adhesion promoters can be from a lower limit of 0.1, 0.2, 0.3, 0.5, 1, 2, 3, or 4 weight percent to an upper limit of 0.1, 0.2, 0.3, 0.5, 1, 2, 3, 4, 5 weight percent.

The pressure sensitive adhesive composition may further include optionally one or more film clarifying additives. The pressure sensitive adhesive composition may comprise less than 5 percent by weight of one or more film clarifying additives. All individual values and subranges from less than 5 weight percent are included herein and disclosed herein; for example, the weight percent of film clarifying additives can be from a lower limit of 0.1, 0.2, 0.3, 0.5, 1, 2, 3, or 4 weight percent to an upper limit of 0.1, 0.2, 0.3, 0.5, 1, 2, 3, 4, 5 weight percent. Exemplary film clarifying additives include, but are not limited to, those commercially available from Eastman Chemical under the tradename Optifilm™ Enhancer 400.

EXAMPLES

The present invention will now be explained in further detail by showing Inventive Examples, and Comparative Examples, but the scope of the present invention is not, of course, limited to these Examples.

Example 1

Sodium carbonate (0.01% BOM, 0.57 g) was added as a buffer to a 96° C. kettle charge of a water (518 g) swept with nitrogen, equipped with overhead stirring, thermometer, and reflux condenser. This was followed by ammonium persulfate (0.217% BOM, 5.85 g) as initiator and a preform seed charge (100 nm starting particle size, 1.251% BOM, 72.8 g) to set the initial particle size. A monomer emulsion feed and cofeed were started. The monomer emulsion consisted of sodium carbonate (0.02% BOM, 1.4 g), itaconic acid (0.2%, 5.2 g), acrylic acid (0.8% BOM, 21 g), disodium ethoxylated alcohol half ester of sulfosuccinic acid (0.17%, 14.7 g), sodium dodeclybenzenesulfonate (0.21% BOM, 24.8 g), butyl acrylate (71.1% BOM, 1870 g), methyl methacrylate (6.0% BOM, 157.2 g), and water (16.8% of total monomer emulsion, 423 g) and was fed for 75 minutes. The cofeed of ammonium persulfate (0.173% BOM, 4.8 g) was fed for 75 minutes. The temperature of the reaction was controlled between 88-90° C. Partway through the monomer emulsion feed an intercept of sodium dodeclybenzenesulfonate (0.235% BOM, 27.4 g) was added to the kettle. Once the addition of the monomer emulsion concluded, the second stage was added. The second stage consisted of styrene (1.6% BOM, 41.9 g). After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.7 g), sodium dodeclybenzenesulfonate (0.05% BOM, 5.5 g), butyl acrylate (5% BOM, 131.4 g), butyl methacrylate (15% BOM, 394.3 g), 3-methylmercaptopropionate (0.38% BOM, 10.1 g) and water (105.7 g) for 20 minutes. One cofeed consisted of t-butlyhydroperoxide (0.4% BOM, 15.5 g) and was fed for 50 minutes. The other cofeed consisted of sodium hydroxymethanesulfonate (0.24% BOM, 8.3 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Example 2

Sodium carbonate (0.01% BOM, 0.57 g) was added as buffer to a 96° C. kettle charge of a water (518 g) swept with nitrogen, equipped with overhead stirring, thermometer, and reflux condenser. This was followed by ammonium persulfate (0.217% BOM, 5.85 g) as initiator and a preform seed charge(100 nm starting particle size, 1.251% BOM, 72.8 g) to set the initial particle size. A monomer emulsion feed and cofeed were started. The monomer emulsion consisted of sodium carbonate (0.02% BOM, 1.4 g), itaconic acid (0.2%, 5.2 g), acrylic acid (0.8% BOM, 21 g), disodium ethoxylated alcohol half ester of sulfosuccinic acid (0.17%, 14.7 g), sodium dodeclybenzenesulfonate (0.21% BOM, 24.8 g), butyl acrylate (71.1% BOM, 1870 g), methyl methacrylate (6.0% BOM, 157.2 g), and water (16.8% of total monomer emulsion, 423 g) and was fed for 75 minutes. The cofeed of ammonium persulfate (0.173% BOM, 4.8 g) was fed for 75 minutes. The temperature of the reaction was controlled between 88-90° C. Partway through the monomer emulsion feed an intercept of sodium dodeclybenzenesulfonate (0.235% BOM, 27.4 g) was added to the kettle. Once the addition of the monomer emulsion concluded, the second stage was added. The second stage consisted of methyl methacrylate (1.6% BOM, 41.9 g). After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.7 g), sodium dodeclybenzenesulfonate (0.05% BOM, 5.5 g), butyl acrylate (5% BOM, 131.4 g), butyl methacrylate (15% BOM, 394.3 g), 3-methylmercaptopropionate (0.38% BOM, 10.1 g) and water (105.7 g) for 20 minutes. One cofeed consisted of t-butlyhydroperoxide (0.4% BOM, 15.5 g) and was fed for 50 minutes. The other cofeed consisted of sodium hydroxymethanesulfonate (0.24% BOM, 8.3 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Example 3

Sodium carbonate (0.01% BOM, 0.57 g) was added as buffer to a 96° C. kettle charge of a water (518 g) swept with nitrogen, equipped with overhead stirring, thermometer, and reflux condenser. This was followed by ammonium persulfate (0.217% BOM, 5.85 g) as initiator and a preform seed charge(100 nm starting particle size, 1.251% BOM, 72.8 g) to set the initial particle size. A monomer emulsion feed and cofeed were started. The monomer emulsion consisted of sodium carbonate (0.02% BOM, 1.4 g), itaconic acid (0.2%, 5.2 g), acrylic acid (0.8% BOM, 21 g), disodium ethoxylated alcohol half ester of sulfosuccinic acid (0.17%, 14.7 g), sodium dodeclybenzenesulfonate (0.21% BOM, 24.8 g), butyl acrylate (71.1% BOM, 1870 g), methyl methacrylate (6.0% BOM, 157.2 g), and water (16.8% of total monomer emulsion, 423 g) and was fed for 75 minutes. The cofeed of ammonium persulfate (0.173% BOM, 4.8 g) was fed for 75 minutes. The temperature of the reaction was controlled between 88-90° C. Partway through the monomer emulsion feed an intercept of sodium dodeclybenzenesulfonate (0.235% BOM, 27.4 g) was added to the kettle. Once the addition of the monomer emulsion concluded, the second stage was added. The second stage consisted of butyl methacrylate (1.6% BOM, 41.9 g). After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.7 g), sodium dodeclybenzenesulfonate (0.05% BOM, 5.5 g), butyl acrylate (5% BOM, 131.4 g), butyl methacrylate (15% BOM, 394.3 g), 3-methylmercaptopropionate (0.38% BOM, 10.1 g) and water (105.7 g) for 20 minutes. One cofeed consisted of t-butlyhydroperoxide (0.4% BOM, 15.5 g) and was fed for 50 minutes. The other cofeed consisted of sodium hydroxymethanesulfonate (0.24% BOM, 8.3 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Example 4

Sodium carbonate (0.01% BOM, 0.57 g) was added as buffer to a 96° C. kettle charge of a water (518 g) swept with nitrogen, equipped with overhead stirring, thermometer, and reflux condenser. This was followed by ammonium persulfate (0.217% BOM, 5.85 g) as initiator and a preform seed charge(100 nm starting particle size, 1.251% BOM, 72.8 g) to set the initial particle size. A monomer emulsion feed and cofeed were started. The monomer emulsion consisted of sodium carbonate (0.02% BOM, 1.4 g), itaconic acid (0.2%, 5.2 g), acrylic acid (0.8% BOM, 21 g), disodium ethoxylated alcohol half ester of sulfosuccinic acid (0.17%, 14.7 g), sodium dodeclybenzenesulfonate (0.21% BOM, 24.8 g), butyl acrylate (71.1% BOM, 1870 g), methyl methacrylate (6.0% BOM, 157.2 g), and water (16.8% of total monomer emulsion, 423 g) and was fed for 75 minutes. The cofeed of ammonium persulfate (0.173% BOM, 4.8 g) was fed for 75 minutes. The temperature of the reaction was controlled between 88-90° C. Partway through the monomer emulsion feed an intercept of sodium dodeclybenzenesulfonate (0.235% BOM, 27.4 g) was added to the kettle. Once the addition of the monomer emulsion concluded, the second stage was added. The second stage consisted of isobornyl methacrylate styrene (1.6% BOM, 41.9 g). After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.7 g), sodium dodeclybenzenesulfonate (0.05% BOM, 5.5 g), butyl acrylate (5% BOM, 131.4 g), butyl methacrylate (15% BOM, 394.3 g), 3-methylmercaptopropionate (0.38% BOM, 10.1 g) and water (105.7 g) for 20 minutes. One cofeed consisted of t-butlyhydroperoxide (0.4% BOM, 15.5 g) and was fed for 50 minutes. The other cofeed consisted of sodium hydroxymethanesulfonate (0.24% BOM, 8.3 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Example 5

Sodium carbonate (0.01% BOM, 0.55 g) was added as buffer to a 96° C. kettle charge of a water (518 g) swept with nitrogen, equipped with overhead stirring, thermometer, and reflux condenser. This was followed by ammonium persulfate (0.217% BOM, 5.9 g) as initiator and a preform seed charge(100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (0.8% BOM, 20.4 g), disodium ethoxylated alcohol half ester of sulfosuccinic acid (0.17%, 14.3 g), sodium dodeclybenzenesulfonate (0.21% BOM, 24.2 g), butyl acrylate (72.25% BOM, 1850 g), methyl methacrylate (6.0% BOM, 152.8 g), and water (16.8% of total monomer emulsion, 411 g) and was fed for 75 minutes. The cofeed of ammonium persulfate (0.173% BOM, 4.6 g) was fed for 75 minutes. The temperature of the reaction was controlled between 88-90° C. Partway through the monomer emulsion feed an intercept of sodium dodeclybenzenesulfonate (0.235% BOM, 26.5 g) was added to the kettle. Once the addition of the monomer emulsion concluded, the second stage was added. The second stage consisted of styrene (0.4% BOM, 10.19 g). After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.6 g), sodium dodeclybenzenesulfonate (0.05% BOM, 5.3 g), butyl acrylate (5% BOM, 127.8 g), butyl methacrylate (15% BOM, 353.3 g), 3-methylmercaptopropionate (0.38% BOM, 9.8 g) and water (105.7 g) for 20 minutes. One cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Example 6

Sodium carbonate (0.01% BOM, 0.55 g) was added as buffer to a 96° C. kettle charge of a water (518 g) swept with nitrogen, equipped with overhead stirring, thermometer, and reflux condenser. This was followed by ammonium persulfate (0.217% BOM, 5.9 g) as initiator and a preform seed charge(100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (0.8% BOM, 20.4 g), disodium ethoxylated alcohol half ester of sulfosuccinic acid (0.17%, 14.3 g), sodium dodeclybenzenesulfonate (0.21% BOM, 24.2 g), butyl acrylate (71.1% BOM, 1818 g), methyl methacrylate (6.0% BOM, 152.8 g), and water (16.8% of total monomer emulsion, 411 g) and was fed for 75 minutes. The cofeed of ammonium persulfate (0.173% BOM, 4.6 g) was fed for 75 minutes. The temperature of the reaction was controlled between 88-90° C. Partway through the monomer emulsion feed an intercept of sodium dodeclybenzenesulfonate (0.235% BOM, 26.5 g) was added to the kettle. Once the addition of the monomer emulsion concluded, the batch was held at temperature. After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.6 g), sodium dodeclybenzenesulfonate (0.05% BOM, 5.3 g), butyl acrylate (5% BOM, 127.8 g), butyl methacrylate (15% BOM, 353.3 g), 3-methylmercaptopropionate (0.38% BOM, 9.8 g) and water (105.7 g) for 20 minutes. One cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. During the monomer emulsion feed the temperature was controlled at 74-76° C. Once the monomer emulsion finished, a third stage was added. The third stage consisted of styrene (1.6% BOM, 40.76 g). The batch was allowed to cool to 65° C. The emulsion was then neutralized with ammonium hydroxide until a pH of 7 was obtained. After neutralization the batch was cooled to below 35° C. and filtered through 100 mesh.

Example 7

Sodium carbonate (0.01% BOM, 0.55 g) was added as buffer to a 96° C. kettle charge of a water (518 g) swept with nitrogen, equipped with overhead stirring, thermometer, and reflux condenser. This was followed by ammonium persulfate (0.217% BOM, 5.9 g) as initiator and a preform seed charge(100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (0.8% BOM, 20.4 g), disodium ethoxylated alcohol half ester of sulfosuccinic acid (0.17%, 14.3 g), sodium dodeclybenzenesulfonate (0.21% BOM, 24.2 g), butyl acrylate (71.1% BOM, 1818 g), methyl methacrylate (6.0% BOM, 152.8 g), and water (16.8% of total monomer emulsion, 411 g) and was fed for 75 minutes. The cofeed of ammonium persulfate (0.173% BOM, 4.6 g) was fed for 75 minutes. The temperature of the reaction was controlled between 88-90° C. Partway through the monomer emulsion feed an intercept of sodium dodeclybenzenesulfonate (0.235% BOM, 26.5 g) was added to the kettle. Once the addition of the monomer emulsion concluded the batch was held at temperature. After fifteen minutes a second stage that consisted of styrene (1.6% BOM, 40.76 g) was added to the kettle. The kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.6 g), sodium dodeclybenzenesulfonate (0.05% BOM, 5.3 g), butyl acrylate (5% BOM, 127.8 g), butyl methacrylate (15% BOM, 353.3 g), 3-methylmercaptopropionate (0.38% BOM, 9.8 g) and water (105.7 g) for 20 minutes. One cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Comparative Example 1

Sodium carbonate (0.01% BOM, 0.55 g) was added as buffer to a 96° C. kettle charge of a water (518 g) swept with nitrogen, equipped with overhead stirring, thermometer, and reflux condenser. This was followed by ammonium persulfate (0.217% BOM, 5.9 g) as initiator and a preform seed charge(100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (0.8% BOM, 20.4 g), disodium ethoxylated alcohol half ester of sulfosuccinic acid (0.17%, 14.3 g), sodium dodeclybenzenesulfonate (0.21% BOM, 24.2 g), butyl acrylate (71.1% BOM, 1818 g), methyl methacrylate (6.0% BOM, 152.8 g), styrene (1.6% BOM, 40.8 g) and water (16.8% of total monomer emulsion, 411 g) and was fed for 75 minutes. The cofeed of ammonium persulfate (0.173% BOM, 4.6 g) was fed for 75 minutes. The temperature of the reaction was controlled between 88-90° C. Partway through the monomer emulsion feed an intercept of sodium dodeclybenzenesulfonate (0.235% BOM, 26.5 g) was added to the kettle. Once the addition of the monomer emulsion concluded, it was held at temperature. After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.6 g), sodium dodeclybenzenesulfonate (0.05% BOM, 5.3 g), butyl acrylate (5% BOM, 127.8 g), butyl methacrylate (15% BOM, 353.3 g), 3-methylmercaptopropionate (0.38% BOM, 9.8 g) and water (105.7 g) for 20 minutes. One cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Comparative Example 2

Sodium carbonate (0.01% BOM, 0.55 g) was added as buffer to a 96° C. kettle charge of a water (518 g) swept with nitrogen, equipped with overhead stirring, thermometer, and reflux condenser. This was followed by ammonium persulfate (0.217% BOM, 5.9 g) as initiator and a preform seed charge(100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (0.8% BOM, 20.4 g), disodium ethoxylated alcohol half ester of sulfosuccinic acid (0.17%, 14.3 g), sodium dodeclybenzenesulfonate (0.21% BOM, 24.2 g), butyl acrylate (72.25% BOM, 1850 g), methyl methacrylate (6.0% BOM, 152.8 g), and water (16.8% of total monomer emulsion, 411 g) and was fed for 75 minutes. The cofeed of ammonium persulfate (0.173% BOM, 4.6 g) was fed for 75 minutes. The temperature of the reaction was controlled between 88-90° C. Partway through the monomer emulsion feed an intercept of sodium dodeclybenzenesulfonate (0.235% BOM, 26.5 g) was added to the kettle. Once the addition of the monomer emulsion concluded, it was held at temperature. After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.6 g), sodium dodeclybenzenesulfonate (0.05% BOM, 5.3 g), butyl acrylate (4.6% BOM, 117.4 g), butyl methacrylate (13.62% BOM, 353.3 g), styrene (1.6% BOM, 41.7 g) 3-methylmercaptopropionate (0.38% BOM, 9.8 g) and water (105.7 g) for 20 minutes. One cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Comparative Example 3

Sodium carbonate (0.01% BOM, 0.57 g) was added as buffer to a 96° C. kettle charge of a water (504 g) swept with nitrogen, equipped with overhead stirring, thermometer, and reflux condenser. This was followed by ammonium persulfate (0.217% BOM, 5.7 g) as initiator and a preform seed charge(100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (0.8% BOM, 20.4 g), disodium ethoxylated alcohol half ester of sulfosuccinic acid (0.17%, 14.3 g), sodium dodeclybenzenesulfonate (0.21% BOM, 24.2 g), butyl acrylate (71.1% BOM, 1818 g), methyl methacrylate (6.0% BOM, 152.8 g), and water (16.8% of total monomer emulsion, 411 g) and was fed for 75 minutes. The cofeed of ammonium persulfate (0.173% BOM, 4.6 g) was fed for 75 minutes. The temperature of the reaction was controlled between 88-90° C. Partway through the monomer emulsion feed an intercept of sodium dodeclybenzenesulfonate (0.235% BOM, 26.5 g) was added to the kettle. Once the addition of the monomer emulsion concluded, the second stage was added. The second stage consisted of styrene (1.6% BOM, 40.7 g). After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. One cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. When the feed was finished the emulsion was neutralized with ammonium hydroxide until a pH of 7 was obtained. After neutralization the batch was cooled to below 35° C. and filtered through 100 mesh.

Comparative Example 4

Sodium carbonate (0.01% BOM, 0.55 g) was added as buffer to a 96° C. kettle charge of a water (504 g) swept with nitrogen, equipped with overhead stirring, thermometer, and reflux condenser. This was followed by ammonium persulfate (0.217% BOM, 5.9 g) as initiator and a preform seed charge(100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (0.8% BOM, 20.4 g), disodium ethoxylated alcohol half ester of sulfosuccinic acid (0.17%, 14.3 g), sodium dodeclybenzenesulfonate (0.21% BOM, 24.2 g), butyl acrylate (68.7% BOM, 1757.5 g), methyl methacrylate (6.0% BOM, 152.8 g), and water (16.8% of total monomer emulsion, 411 g) and was fed for 75 minutes. The cofeed of ammonium persulfate (0.173% BOM, 4.6 g) was fed for 75 minutes. The temperature of the reaction was controlled between 88-90° C. Partway through the monomer emulsion feed an intercept of sodium dodeclybenzenesulfonate (0.235% BOM, 26.5 g) was added to the kettle. Once the addition of the monomer emulsion concluded, the second stage was added. The second stage consisted of styrene (4.0% BOM, 101.9 g). After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.6 g), sodium dodeclybenzenesulfonate (0.05% BOM, 5.3 g), butyl acrylate (5% BOM, 127.8 g), butyl methacrylate (15% BOM, 353.3 g), 3-methylmercaptopropionate (0.38% BOM, 9.8 g) and water (105.7 g) for 20 minutes. One cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. During the monomer emulsion feed the temperature was controlled at 74-76° C. Once the monomer emulsion finished, the batch was allowed to cool to 65° C. The emulsion was then neutralized with ammonium hydroxide until a pH of 7 was obtained. After neutralization the batch was cooled to below 35° C. and filtered through 100 mesh.

Comparative Example 5

Sodium carbonate (0.01% BOM, 0.55 g) was added as buffer to a 96° C. kettle charge of a water (518 g) swept with nitrogen, equipped with overhead stirring, thermometer, and reflux condenser. This was followed by ammonium persulfate (0.217% BOM, 5.9 g) as initiator and a preform seed charge(100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (1.0% BOM, 20.4 g), disodium ethoxylated alcohol half ester of sulfosuccinic acid (0.17%, 14.3 g), sodium dodeclybenzenesulfonate (0.21% BOM, 24.2 g), butyl acrylate (91.23% BOM, 1859 g), methyl methacrylate (7.52% BOM, 152.8 g), and water (16.8% of total monomer emulsion, 411 g) and was fed for 75 minutes. The cofeed of ammonium persulfate (0.173% BOM, 4.6 g) was fed for 75 minutes. The temperature of the reaction was controlled between 88-90° C. Partway through the monomer emulsion feed an intercept of sodium dodeclybenzenesulfonate (0.235% BOM, 26.5 g) was added to the kettle. Once the addition of the monomer emulsion concluded, it was held at temperature. After fifteen minutes a cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. The batch was allowed to cool to 65° C. The emulsion was then neutralized with ammonium hydroxide until a pH of 7 was obtained. After neutralization the batch was cooled to below 35° C. and filtered through 100 mesh.

The samples were direct coated to 2 mL PET(Chemsultants), dried in a lab oven at 80° C. for five minutes, and then closed to RP-12 release liner. Samples were prepared at 20 g/m² coat weight. They were equilibrated at 23° C. and 50% relative humidity before testing. One inch strips were cut and affixed to either stainless steel (SS) or high density polyolefin (HDPE) panels (available from Chemsultants). The samples were allowed to equilibrate 20 min (Dwell) on the SS before the peel was determined or 24 hours on the HDPE. Peels were measured according to PSTC test method 101. Shear was measured with a 1"×1" geometry and a 1 kilogram weight and measured according to PSTC test method 107. The time in hours at which the weight falls is the shear value.

The results of these tests are shown in the table below.

|  | Description | Peel from HDPE, 180°, 24 hour (N/inch) | Tack from SS (N) | Shear (1" × 1" × 1 kg), hours |
|---|---|---|---|---|
| Example 1 | 3-Stage Process w/Styrene | 4.0 | 9.4 | 105 |
| Example 2 | 3-Stage Process w/MMA | 3.8 | 10.3 | 66 |
| Example 3 | 3-Stage Process w/BMA | 7.5 | 15.2 | 22 |
| Example 4 | 3-Stage Process w/IBOMA | 2.0 | 12.1 | 39 |
| Example 5 | Decrease amt of Stage 2 (Styrene) | 5.5 | 12.0 | 40 |
| Example 6 | Reverse the order of Stages 1 and 2 | 4.5 | 10.3 | 60 |
| Example 7 | Increase time between Stages 1 and 2 | 6.3 | 11.2 | 62 |
| Comparative Example 1 | Combine Stages 1 and 2 | 4.8 | 9.7 | 13 |
| Comparative Example 2 | Combine Stages 2 and 3 | 4.2 | 10.0 | 31 |
| Comparative Example 3 | Stages 1 and 2 Only | 1.9 | 8.0 | 122 |
| Comparative Example 4 | Increase amt of Stage 2 (Styrene) | 1.3 | 12.0 | 41 |
| Comparative Example 5 | Stage 1 only | 1.3 | 8.2 | 122 |

The invention claimed is:

1. A method consisting of:
a) dispersing and allowing to at least partially polymerize a first monomer mixture, a surfactant, and an initiator in an aqueous medium, the first monomer mixture comprising a monomer selected from the group consisting of butyl acrylate, ethylhexyl acrylate, ethyl acrylate, isooctyl acrylate, and combinations thereof and the partially polymerized first monomer mixture having a total glass transition temperature ("Tg") in the range of from −10 to −65° C.;
b) after the first monomer mixture is completely dispersed in the aqueous medium, adding and allowing to at least partially polymerize a second monomer mixture to the aqueous medium, the second monomer mixture comprising isobornyl (meth)acrylate and the partially polymerized second monomer mixture having a total Tg of at least 20° C. greater than the Tg of the first monomer mixture;
c) after the second monomer mixture is completely dispersed in the aqueous medium, adding and allowing to at least partially polymerize, a third monomer mixture to the aqueous medium, the third monomer mixture comprising a monomer selected from butyl methacrylate, butyl acrylate, styrene, and combinations thereof and the partially polymerized third monomer mixture having a total Tg of from −25 to 50° C.; and
d) forming a polymer with the first, second, and third monomer mixtures,
wherein the first monomer mixture accounts for from 73 to 79.5 weight percent of the total weight of the first monomer mixture, the second monomer mixture, and the third monomer mixture,
wherein the second monomer mixture accounts for from 0.5 to 7 weight percent of the total weight of the first monomer mixture, the second monomer mixture, and the third monomer mixture.

* * * * *